United States Patent [19]
Saund et al.

[11] Patent Number: 5,764,383
[45] Date of Patent: Jun. 9, 1998

[54] PLATENLESS BOOK SCANNER WITH LINE BUFFERING TO COMPENSATE FOR IMAGE SKEW

[75] Inventors: Eric Saund, San Carlos; Andrew A. Berlin, Palo Alto, both of Calif.

[73] Assignee: Xerox Corporation, Stamford, Conn.

[21] Appl. No.: 657,704

[22] Filed: May 30, 1996

[51] Int. Cl.⁶ .................... H04N 1/04; G03B 27/32

[52] U.S. Cl. ............... 358/497; 358/493; 358/488; 358/474; 382/289; 355/25; 399/362

[58] Field of Search .................. 358/497, 493, 358/488, 474, 447; 382/289, 290, 291, 293, 295, 296, 287, 285; 355/25, 82; 399/395, 362

[56] References Cited

U.S. PATENT DOCUMENTS

| | | | |
|---|---|---|---|
| 4,723,297 | 2/1988 | Postl | 382/46 |
| 4,776,027 | 10/1988 | Hisano et al. | 382/291 |
| 4,807,296 | 2/1989 | Ando et al. | 382/291 |
| 4,980,720 | 12/1990 | Siegel | 355/233 |
| 5,084,611 | 1/1992 | Okisu et al. | 250/208.1 |
| 5,119,206 | 6/1992 | Rourke et al. | 358/296 |
| 5,140,646 | 8/1992 | Ueda | 382/289 |
| 5,187,753 | 2/1993 | Bloomberg et al. | 382/46 |
| 5,212,568 | 5/1993 | Graves et al. | 358/474 |
| 5,243,665 | 9/1993 | Maney et al. | 382/8 |
| 5,276,530 | 1/1994 | Siegel | 358/406 |
| 5,359,207 | 10/1994 | Turner | 257/81 |
| 5,377,019 | 12/1994 | Okisu et al. | 358/464 |
| 5,416,609 | 5/1995 | Matsuda et al. | 358/474 |

(List continued on next page.)

FOREIGN PATENT DOCUMENTS

3546404A1 8/1993 Germany .............. G02B 27/02

OTHER PUBLICATIONS

U.S. Patent Application No. 08/570,880 entitled "Bound Document Imager with Page Turner" to Turner et al., filed on Dec. 12, 1995.

U.S. Patent Application No. 08/570,791 entitled "Bound Document Imager with Air Jet Page Turning System" to Turner et al., filed on Dec. 12, 1995.

Wong, H., Kang, W., Giordano, F.P. and Yao, Y.L., "Performance Evaluation of a High–Quality TDI–CCD Color Scanner," SPIE vol. 1656 High –Resolution Sensors and Hybrid Systems (1992), pp. 183–194.

(List continued on next page.)

Primary Examiner—Edward L. Coles, Sr.
Assistant Examiner—Madeleine Au Nguyen
Attorney, Agent, or Firm—Thomas B. Zell

[57] ABSTRACT

A platenless book scanner with line buffering performs electronic perspective correction to account for rotation of the spine of a non-planar bound document relative to a reference line in a support plane of the platenless book scanner. A pre-scan of the non-planar bound document is performed to provide a geometrical contour map of the bound document. The geometrical contour map, which identifies displacement of the bound document from the support plane, is analyzed to calculate an angular offset between a spine of the bound document and the reference line in the support plane. The angular offset is used to identify a minimum number of scan line buffers for recording image data, from a set of scan line buffers. Once the minimum number of scan line buffers is filled with recorded image data, distortions caused by displacements of the non-planar bound document from the support plane and skew of the bound document relative to the reference line in the support plane are corrected. A scan line of image data is corrected by polling locations in the set of scan line buffers in accordance with the geometrical contour map, and by interpolating the polled locations to provide output pixels. To correct additional scan lines of image data some of the image data stored in the minimum number of image buffers is replaced after recording more image data.

25 Claims, 6 Drawing Sheets

U.S. PATENT DOCUMENTS

| | | | |
|---|---|---|---|
| 5,497,236 | 3/1996 | Wolff et al. | 358/296 |
| 5,585,926 | 12/1996 | Fujii et al. | 358/471 |
| 5,616,914 | 4/1997 | Matsuda | 250/208.1 |
| 5,659,404 | 8/1997 | Matsuda | 358/474 |
| 5,677,776 | 10/1997 | Matsuda | 358/475 |

OTHER PUBLICATIONS

Ballard, D.H., Brown, C.M., "Boundary Detection," *Computer Vision*, Published by Prentice–Hall, Inc., Englewood Cliffs, NJ, pp. 119–148.

Ballard, D.H., Brown, C.M., "Imaging Devices for Computer Vision," Computer Vision, Published by Prentice–Hall, Inc., Englewood Cliffs, NJ, pp. 52–56.

TZ–3BWC Combination grayscale/24–bit color scanner, Truvel Corporation Data Sheet, two pages. (Data Sheet printed in Apr. 1989).

Strat, T.M., "Recovering the Camera Parameters from a Transformation Matrix," Readings in Computer Vision: Issues, Problems, Principles, and Paradigms, Morgan Kaufmann Publishers, Inc., Los Altos, CA., pp. 93–100.

PLATENLESS BOOK SCANNER WITH LINE BUFFERING TO COMPENSATE FOR IMAGE SKEW

The present invention relates generally to a system for scanning bound documents, and more particularly to a platenless scanner that de-warps skewed images recorded with a scan bar and stored in a set of line buffers.

BACKGROUND OF THE INVENTION

Book scanners are becoming more prevalent given the advent of inexpensive digital storage and the ease with which digital information can be disseminated and reproduced. Recording bound documents in a digital format has become an important manner in which to preserve information in ancient books, periodicals, manuscripts, or any other document having a bound edge with a hard or soft cover. Institutions such as the Library of Congress, the Vatican library, arid university libraries seek to scan large numbers of volumes of books, both to create digital libraries capable of feeding the information superhighway and to halt the rapid decay of information stored in older printed works. Once the content of a page of a bound document is scanned and electronically recorded, the recorded digital image can then be manipulated or processed to enhanced forms not originally available in its bound format. For example, digital images recorded on a storage medium can be reproduced audibly using applications that generate speech from ASCII text. Alternatively, bound documents digitally recorded can be reformatted and supplemented with additional information and reproduced on demand as hardcopy using an electronic printing machine or the like.

Different arrangements exist for scaring bound documents. Most arrangements are traditional flat-bed platen scanners that scan bound documents in a face-down position. A disadvantage of flat-bed scanning arrangements is that they require the application of a force to the spine region of a bound document to insure that the bound document comes within a scanner's depth of focus. Besides damaging the spine region of a bound document, the scanning process is tedious and time-consuming because the bound document must be repositioned after scanning each page. In addition, image quality is often poor due to loss of focus, uneven illumination, and distortion caused by curvature of a page in the vicinity of the binding. U.S. Pat. Nos. 4,980,720 and 5,276,530 to Siegel disclose an improved arrangement that minimizes the application of force to the spine region of a bound document and improves the image quality of scanned images. Specifically, Siegel discloses a flat-bed scanner with a book mode that minimizes the force typically applied to the spine region of a bound document. In the book scan mode, a page height detector mounted on a scan carriage accounts for the deviation of a book page from the horizontal platen plane in the vicinity of a book's binding. In addition, electronic correction of the captured image is used to compensate for loss of focus, image compression, and uneven illumination. Besides electronic correction, the quality of captured images is maximized by modifying mechanical parameters such as scan rate, and local light source intensity.

Other face-down scanning arrangements minimize the stress on the spine region of bound documents by forming a wedge or an angled platen. Examples of wedge platens for scanning bound documents include, U.S. Pat. No. 5,359,207 to Turner and German Patent DE-A1 3546404. Turner discloses a book scanner with contact imaging that employs two-dimensional sensor arrays that are attached at a common edge and disposed in a wedge shaped manner. German Patent DE-A1 3546404 discloses a roof-shaped book support apparatus for use in a copier application. The optics of the roof-shaped copier arrangement provide that opposing pages of a bound book are simultaneously imaged in the same image plane.

In alternate arrangements, platenless scanners capture image data with a document in a face-up position. Such arrangements do not require additional stress to be applied the binding, region of a document when scanned since the document is scanned in its natural open condition. For example, platenless scanners that record a bound document opened face-up from above are disclosed in U.S. Pat. Nos. 5,084,611; 5,377,019; and 5,416,609. Specifically, U.S. Pat. No. 5,084,611 discloses a document reading apparatus which is disposed above a document table. Curves of the bound document are detected using a curvature detector which includes a linear light source. In addition, the linear light source defines a brightness distribution which is used to rectify image signals received from the document reading means. U.S. Pat. No. 5,377,019 discloses a reading apparatus which can determine an effective image pickup area containing objects such as an operator's hand. U.S. Pat. No. 5,416,609 discloses an image pickup apparatus with a focus adjusting means for controlling an imaging optical system so that an image is in focus on a line sensor during scanning.

In order to facilitate the copying or reproduction of bound documents a plurality of automatic page turning apparatuses have been developed. Such page turning apparatuses minimize the amount of manual effort required to electronically capture the contents of a bound document, as disclosed for example in U.S. patent application Ser. No. 08/570,880 entitled "Bound Document Imager with Page Turner" to Turner et al., filed on Dec. 12, 1995 and assigned to the same assignee as the present invention, and U.S. patent application Ser. No. 08/570,791 entitled "Bound Document Imager with Air Jet Page Turning System" to Turner et al., filed on Dec. 12, 1995 and assigned to the same assignee as the present invention. Further advances have been made to electronic publishing systems to offer job programming of books on a flat bed scanning system. For example, U.S. Pat. No. 5,119,206 to Rourke et al. discloses a system that can be programmed to scan either a selected side or both sides of the bound document. Also, U.S. Pat. No. 5,212,568 to Graves et al. discloses an electronic reprographic apparatus for selectively controlling the areas of the document to be imaged.

In general, a restricted geometry simplifies the design of a book scanner by placing additional requirements on a book scanner operator. For example, a book scanner with a restricted geometry will often require the operator to align the spine of a book being scanned with a reference line in the support plane of the scanner. By making this assumption, page shape for a restricted geometry can be modeled using a planar curve oriented perpendicular to the spine of a book, where the planar curve is constant for all cross sections taken at different locations along the spine of the bound document. In addition, by making this assumption perspective imaging terms that are not ordinarily separable with a book scanner having a more general imaging geometry can be decomposed into separate components. More specifically, a system having a restricted geometry can decompose image distortion into two orthogonal components that can be independently corrected using optical or image processing techniques. For example, two terms defining distortion that can be independently corrected are magnification and spacing (i.e. foreshortening). The magnification term is used to correct distortions occurring in image data along the fast scan direction, while the spacing term is used to correct distortions occurring in image data along the slow scan direction. A more general imaging geometry in contrast removes the burden from the operator and passes it back to the book scanner. However, the additional freedom given to an operator increases the complexity of the book scanner.

An assumption that a scanner has a restricted geometry is advantageous because distortions of each scan line of an image can be independently corrected, however, this assumption does not take into account distortions that occur when a book is skewed away from the fast scan direction of a support plane. Consequently, errors that occur because the book is not exactly aligned with the fast scan direction of a scan bar, cannot be corrected by a scanner with a restricted geometry. In addition, in the case of restricted geometry, one scan line of image data captured by a scan bar is not sufficient to simultaneously correct distortions from skew, magnification, and spacing. Accordingly, it would be desirable to have a book scanner that records an image using a scan bar while simultaneously correcting distortions resulting not only from magnification and spacing but from skew as well.

SUMMARY OF THE INVENTION

In accordance with one aspect of the invention, there is provided a method for correcting image distortion while scanning a bound document. The method includes the steps of: providing a support defining a support plane with a reference line therein; positioning the bound document on the support, the bound document having non-planar page contours spaced a distance from the support plane, and the bound document having a spine skewed relative to the reference line in the support plane; pre-scanning the bound document to provide a three-dimensional geometrical contour map identifying the distance the non-planar page contours of the bound document are spaced from the support plane; analyzing the geometrical contour map to measure skew between the spine of the bound document and the reference line in the support plane; providing a set of scan line buffers for storing multiple scan lines of image data that are recorded parallel to the reference line in the support plane; selecting a minimum number of scan line buffers in the set of scan line buffers sufficient to capture an entire scan line of data aligned parallel to the spine of the bound document having the measured skew determined by the analyzing step; scanning the bound document to fill with image data the minimum number of scan line buffers identified by the selecting step, the scanning step scanning along a scan path parallel to the reference line in the support plane; and polling the image data stored in the minimum number of scan line buffers in accordance with the geometrical contour map to correct for the measure of skew of the spine of the bound document relative to the reference line in the support plane, and to correct the distance the non-planar page contours are spaced from the support plane, the polling step identifying locations in the set of scan line buffers to provide a corrected scan line of image data aligned along an axis parallel to an edge of the bound document.

In accordance with another aspect of the invention, there is provided a method for scanning a bound document on a support defining a support plane. The method includes the steps of: recording pre-scan data during a first scan of the bound document, the prescan data providing a three dimensional geometrical contour map of a page of the bound document relative to the support plane; calculating from the geometrical contour map an angular offset, the angular offset providing a measure of skew between a reference axis of the bound document relative to a reference line in the support plane; identifying a set of scan line buffers for storing a scan line of image data, the number of scan line buffers in the set of scan line buffers being a function of the calculated angular offset; recording image data during a second scan of the bound document, the image data filling each scan line buffer in the set of scan line buffers; and polling pixels in the set of scan line buffers in accordance with the geometrical contour map to provide corrected image data of the bound document.

In accordance with yet another aspect of the invention, there is provided an apparatus for scanning a bound document. A support holds the bound document in an open condition in a support plane with a reference line defined therein. Means record geometrical image data of the bound document, the geometrical image data providing a non-planar map of the bound document in three-dimensions relative to the support plane. Means analyze the geometrical image data to identify an angular offset between a reference axis of the bound document and the reference line in the support plane, the angular offset providing a measure of skew between the reference axis of the bound document and the reference line in the support plane. Means identify a set of scan line buffers for storing multiple scan lines of image data, the set of scan line buffers being a function of the angular offset determined by the analyzing means. Means scan the bound document to record a set of scan lines of image data sufficient to fill the set of scan line buffers, each scan line in the set of scan lines of image data being aligned along an axis parallel to the reference line in the support plane. An output scan line generator corrects image data stored in the set of scan line buffers, the output scan line generator polling the image data stored in the set of scan line buffers in accordance with the geometrical contour map to correct the angular offset of the recorded image data, the output scan line generator identifying locations in the set of scan line buffers to provide a corrected scan line of image data aligned parallel to the reference axis of the bound document.

BRIEF DESCRIPTION OF THE DRAWINGS

These and other aspects of the invention will become apparent from the following description which illustrates preferred and alternative embodiments of the invention read in conjunction with the accompanying drawings wherein the same reference numerals have been applied to like parts and in which.

DETAILED DESCRIPTION

Figure 1:
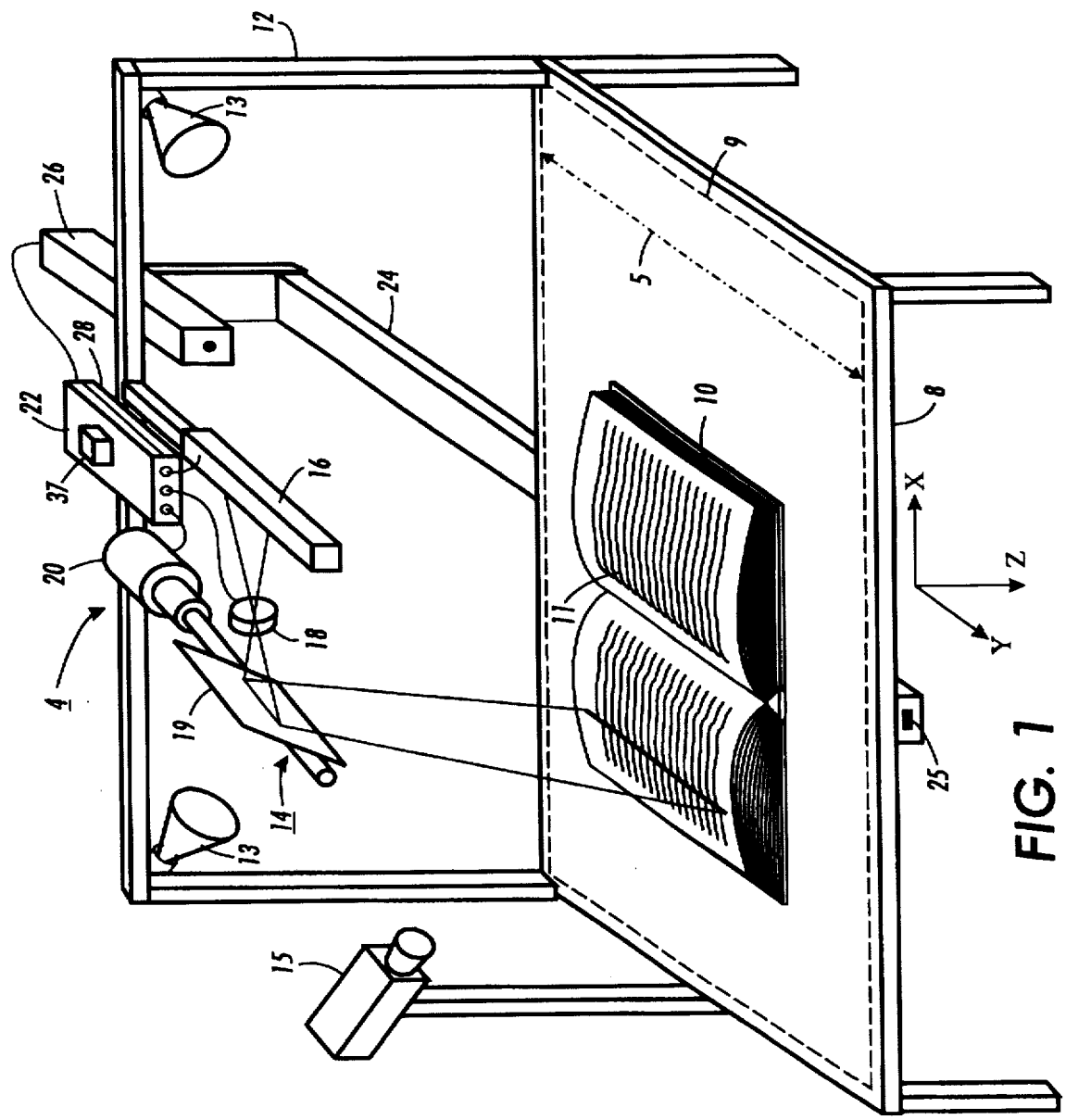
FIG. 1 is an illustration of a system for scanning bound documents incorporating the present invention.

Referring now to the drawings where the showings are for the purpose of describing the preferred embodiment of the invention and not for limiting same, FIG. 1 shows a scanning system 4 incorporating the present invention which is adapted to scan bound documents face up in an open condition. Generally, the bound document scanning system 4 includes a platform 8 for supporting a bound document 10 in an open condition. The geometry of the scanning system 4 is fixed to a support plane that is defined generally by the area enclosed by dotted line 9 on the platform 8. The support plane of the scanning system 4, which is defined in an x-y plane of a three-dimensional coordinate system, includes a reference line 5 parallel to the y-axis of the coordinate system. It will be understood by those skilled in the art that the platform 8 can have a wedge or angled shape. A frame 12 which supports light sources 13, is mounted on the sides of platform 8 for illuminating the support plane 9. Attached to the top of frame 12 is a scanning assembly 14 which includes scan bar 16, lens assembly 18, mirror 19, mirror motor 20, scan controller 22, and an image processing system (IPS) 28. The lens assembly 18 focuses optical image data reflected by mirror 19 onto scan bar 16 which is aligned parallel to the reference line 5. An array of photosensors in scan bar 16 converts the optical image data into electrical image data using a charge coupled device (CCD) which is well known in the art. For example, a scanning carriage system using a CCD is disclosed in U.S. Pat. No. 5,276,530, the pertinent portions of which are incorporated herein by reference.

With continued reference to FIG. 1, light stripe projector 26 is mounted on frame 24 which is attached to platform 8. The light stripe projector 26 is positioned a distance from platform 8 so that beams of light created by projector 26 strike the surface of bound document 10 at an oblique angle. Light stripe projector 26 is used by the scanning system 4 to measure the shape of the surface of bound document 10 by projecting at least two stripes of light across the bound document 10 on platform 8. The basic principles of light striping are described by Ballard et al. in "Computer Vision", Prentice-Hall, 1982 pp. 52–54. Light striping is a type of structured light in which the illumination of an object in a scene is used to extract geometrical information about the object itself. Here, light striping is used to identify the shape of bound document 10 on platform 8. More specifically, light stripping is performed in order to detect the three-dimensional shape of a page and thereby correct distortions caused by image perspective, skew, and compression or elongation introduced by the uneven surface of bound document 10. The light-stripe source 26 can contain either a laser or an ordinary light bulb that projects an image of a slit. It will be understood, however, by those skilled in the art that there exist a number of different methods which can be used to measure the shape of a bound document in an open condition. In alternate embodiments, the three-dimensional surface of bound document 10 can be measured using stereo vision, laser rangefinding, sonar rangefinding, projection of a grid, or an alternate mechanical means.

Figure 2:
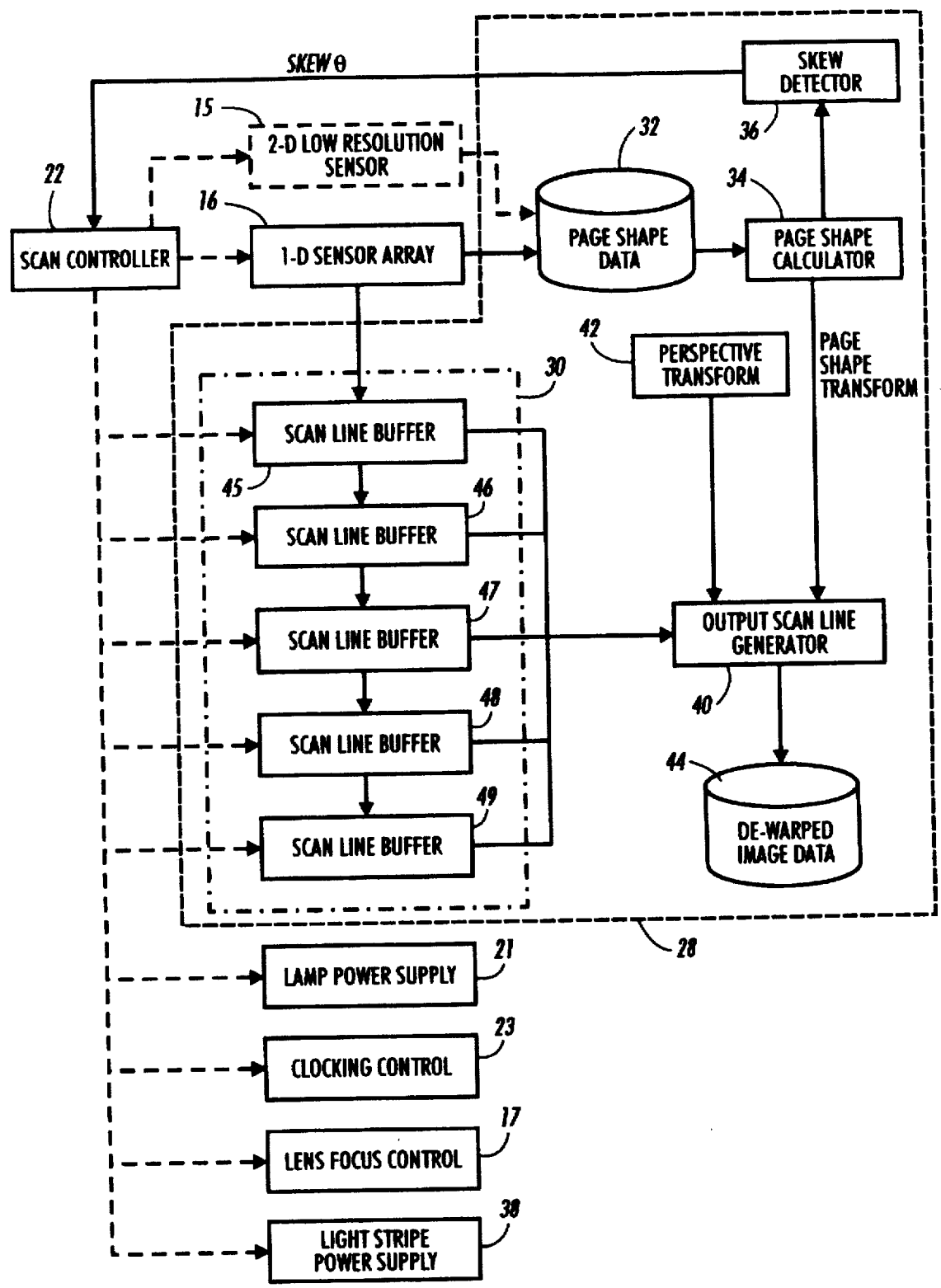
FIG. 2 is a general block diagram of the system architecture of the bound document scanning system shown in FIG. 1.

FIG. 2 shows a general block diagram of the system architecture of bound document scanning system 4. Scan controller 22 which operates in one of two states coordinates the operational units of document scanning system 4. In one state, geometrical page shape data is recorded and in the another state raw image data is recorded by scan bar 16.

When geometrical page shape data is recorded in the first state, signals from controller 22 adjusts power supply 38 of light stripe projector 26 to project at least two light stripes along the x-axis of the support plane 9. In one embodiment, scan bar 16 sub-samples the support plane 9 and stores in memory geometrical page shape data 32 for processing by page shape calculator 34. The storage device 32 may include RAM, flash memory, floppy disk, or another form of optical or magnetic storage. In an alternate embodiment, geometrical page shape data is recorded using a low resolution two-dimensional sensor array 15. Once page shape data for a bound document is recorded in memory 32, page shape calculator 34 determines a page shape transform that defines an output page in two-dimensions as viewed in three dimensions in the support plane 9. In addition, the page shape calculator provides sufficient data to skew detector 36 to determine the amount a reference axis of bound document 10 such as spine 11 is skewed away from the reference line 5 in support plane 9. Output from skew detector 36 is a skew angle $\theta$ that represents an offset of the spine 11 of the bound document 10 from the reference line 5 in the support plane 9. Using the value of skew angle $\theta$, scan controller 22 determines the number of buffers in the set of scan line buffers 30 that are required to capture bound document 10 and correct image deformations in accordance with the present invention.

In the second state, scan controller 22 directs sensor array 16 to store recorded raw image data in scan line buffer 45. When a subsequent scan line of raw image data is recorded, scan controller 22 shifts data from scan line buffer 45 to scan line buffer 46 before storing raw image data from the subsequent scan line in buffer 45. The number of scan line buffers filled in the set of scan line buffers 30 must be sufficient to capture an entire scan line of warped image data (i.e. the greater the value of skew angle $\theta$, the more scan line buffers are required to be filled). While scanning image data with scan bar 16, scan controller 22 adjusts lamp power supply 21, clocking motor control 23, and lens focal length control 17. The lamp power supply 21 of light sources 13 and the lens focal length control 17 of lens assembly 18 are adjusted in accordance with the geometrical shape of the page of the bound document 10 as determined by page shape calculator 34. Once the required number of buffers in the set of buffers 30 are filled with raw image data, output scan line generator 40 corrects the raw image data in accordance with the page shape transform determined by calculator 34 and the perspective transform 42.

More specifically, in the second state after initially filling scan line buffer 45 with raw image data, scan controller 22 shifts the raw image data from scan line buffer 45 to scan line buffer 46 before storing raw image data from a subsequent scan line in buffer 45. This process is repeated until the required number of scan line buffers are filled with raw image data. For example, in the case that five buffers 45–49 are required to capture bound document 10, raw image data recorded by sensor array 16 is stored in scan line buffer 45 only after raw image data from previous scan lines is shifted from buffer 48 to buffer 49, from buffer 47 to buffer 48, from buffer 46 to buffer 47, and from buffer 45 to buffer 46. After filling the required number of scan line buffers, output scan line generator 40 corrects image deformations in the raw image data stored in the set of scan line buffers 30. Subsequently, the output scan line generator 40 stores in a memory the corrected image data as de-warped image data 44.

Figure 3:
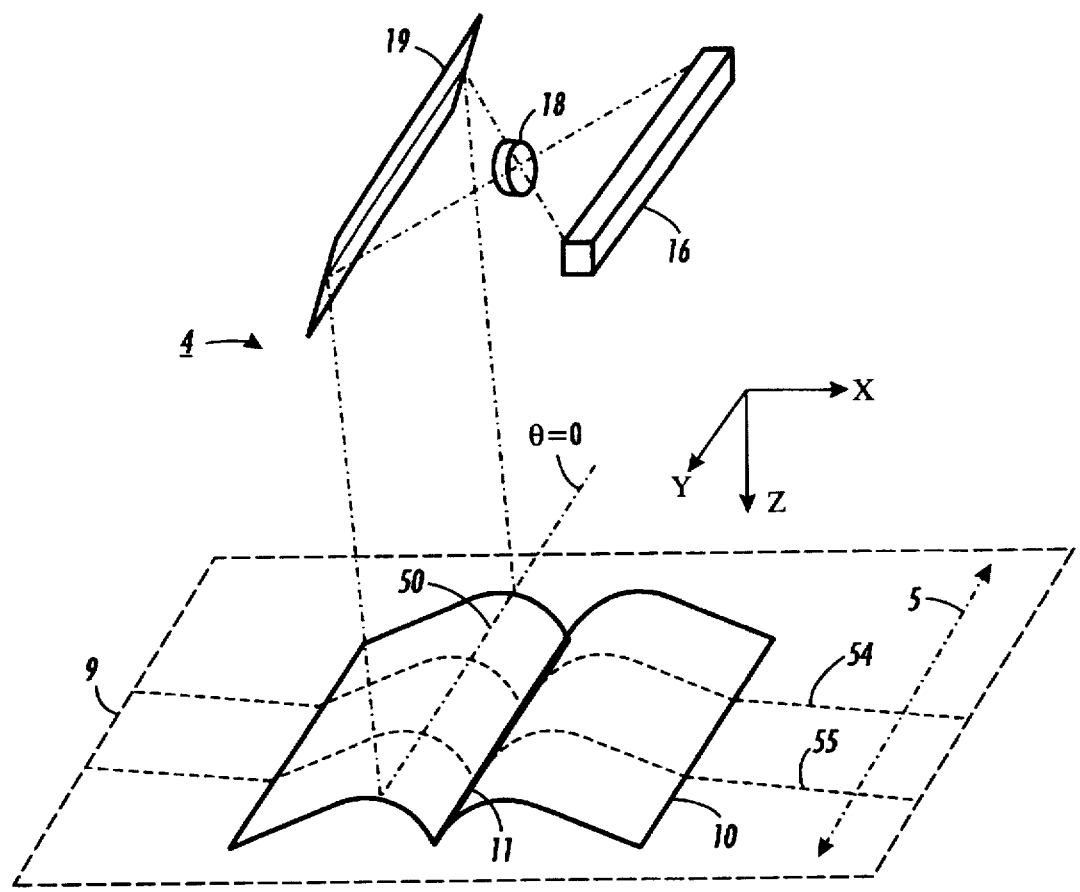
FIG. 3 illustrates an example in which the skew between the spine of a bound document and a reference line in the support plane is zero.
Figure 4:
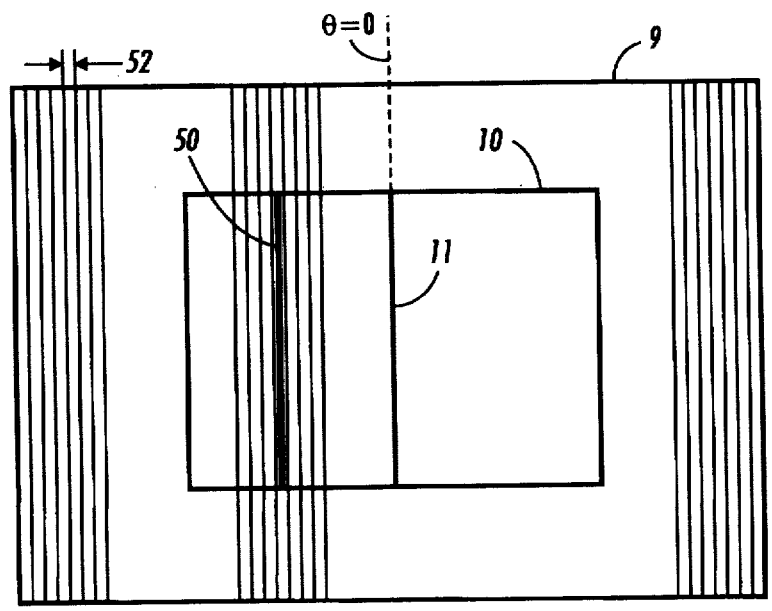
FIG. 4 is a top view of the illustration shown in FIG. 3.

FIGS. 3 and 4 illustrate an example of a unique instance in which the output from skew detector 36 is zero. FIG. 4 is a top view of the scanning system 4 shown in FIG. 3. In FIG. 3, the value of skew angle θ is zero because the spine 11 of bound document 10 is aligned along the y-axis of platform 8, which is parallel to reference line 5 in support plane 9. When the skew angle θ is zero, a scan line 50 recorded across bound document 10 by scan bar 16 is not distorted due to skew. In this case, a scan line recorded along bound document 10 can be corrected for image distortion using a restricted geometry. With a restricted geometry, distortions due to magnification and spacing decompose into two orthogonal components that can be independently corrected using clock motor control 23, and lens focal length control 17. In FIG. 4 which is a top-view of support plane 9, spacing 52 represents incremental advances that are made over support plane 9 by scanning assembly 14. It will be understood by those skilled in the art that even though each spacing 52 across image area 9 is even in FIG. 4, the spacing 52 can vary depending on the page shape of bound document 10 determined by page shape calculator 32 by adjusting clocking control 23 of mirror motor 20. It will also be understood by those skilled in the art that magnification and spacing corrections can be performed in an alternative embodiment using well known image processing techniques.

Figure 5:
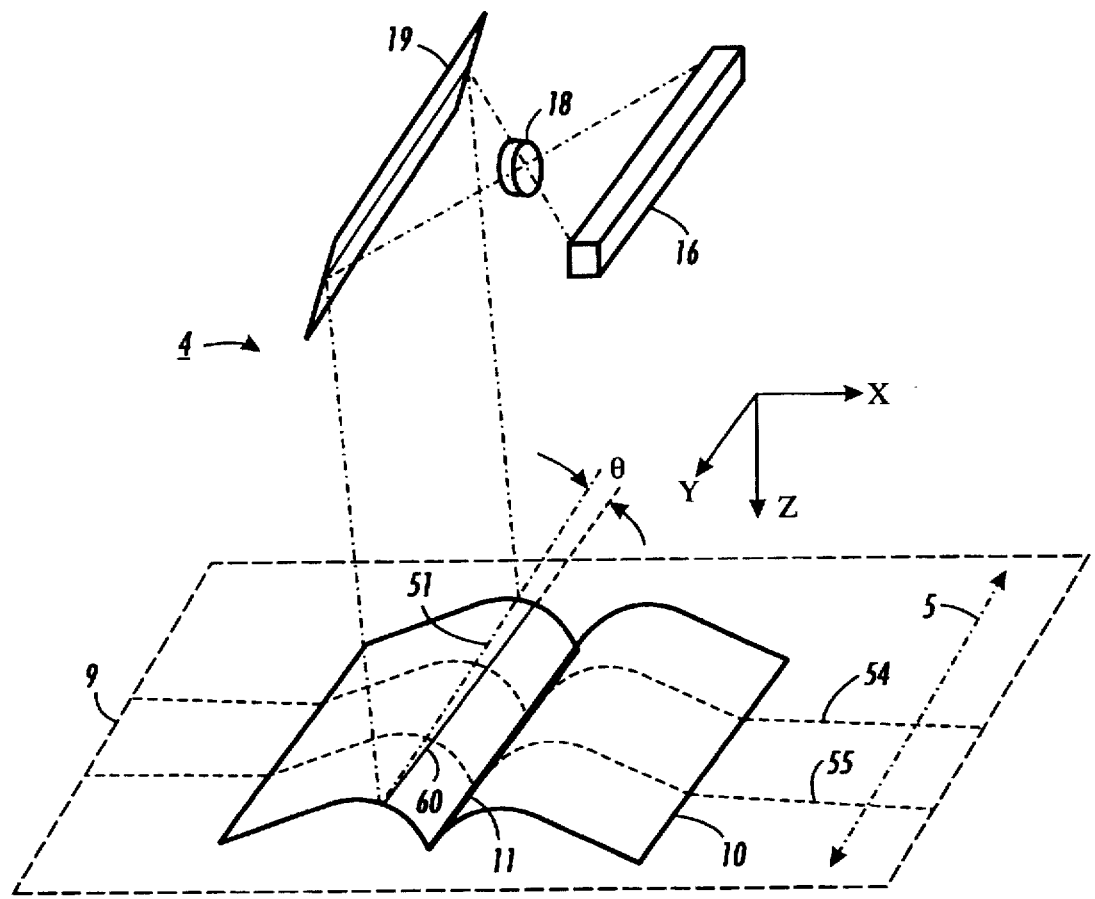
FIG. 5 illustrates an example in which the skew between the spine of a bound document and a reference line in the support plane is not zero.
Figure 6:
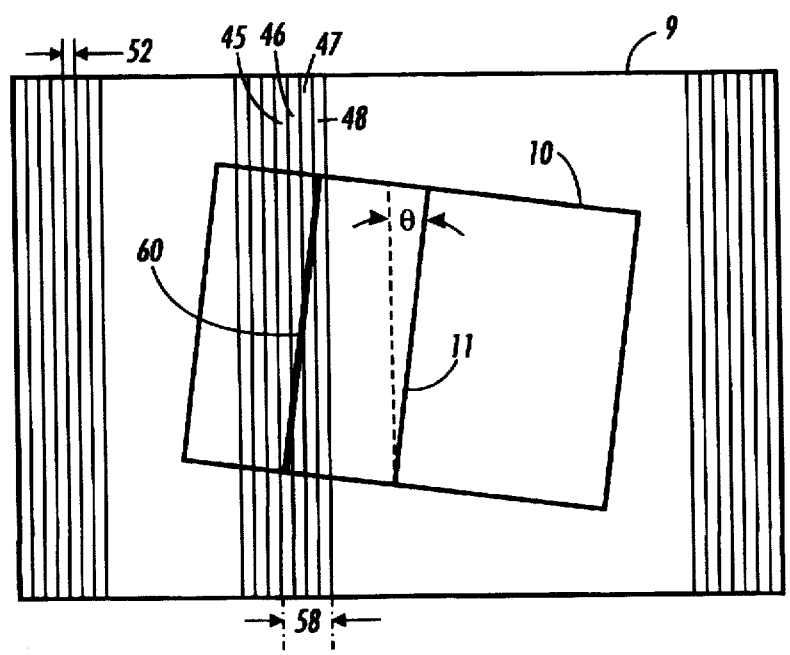
FIG. 6 is a top view of the illustration shown in FIG. 5.

FIGS. 5 and 6 illustrate a more general example in which the output from skew detector 36 is not zero. FIG. 6 is a top view of the scanning system 4 shown in FIG. 5. In FIG. 5, scanning assembly 14 records raw image data along scan line 51. However, unlike the example shown in FIG. 3 in which the scan line 50 is aligned with the spine 11 of bound document 10, the example shown in FIGS. 5 and 6 illustrates an instance in which the spine 11 of bound document 10 is offset by an angle θ from scan line 51 which is parallel to reference line 5 in support plane 9. In accordance with the invention, distortions in scan line 51 cannot be corrected unless additional scan lines of raw image data is recorded by scanning assembly 14. Reference numeral 58 in FIG. 6 illustrates the number of scan line buffers in the set of scan line buffers 30 that must be filled with raw image data before skew distortions can be corrected by output scan line generator 40. Specifically in this example, a minimum number of scan line buffers 45-48 are required to be filled in order to correct distortions resulting from image skew, magnification, and spacing. The corrected image data from scan line buffers 45-48 providing a single scan line of de-warped image data indicated generally by reference numeral 60.

Figure 7:
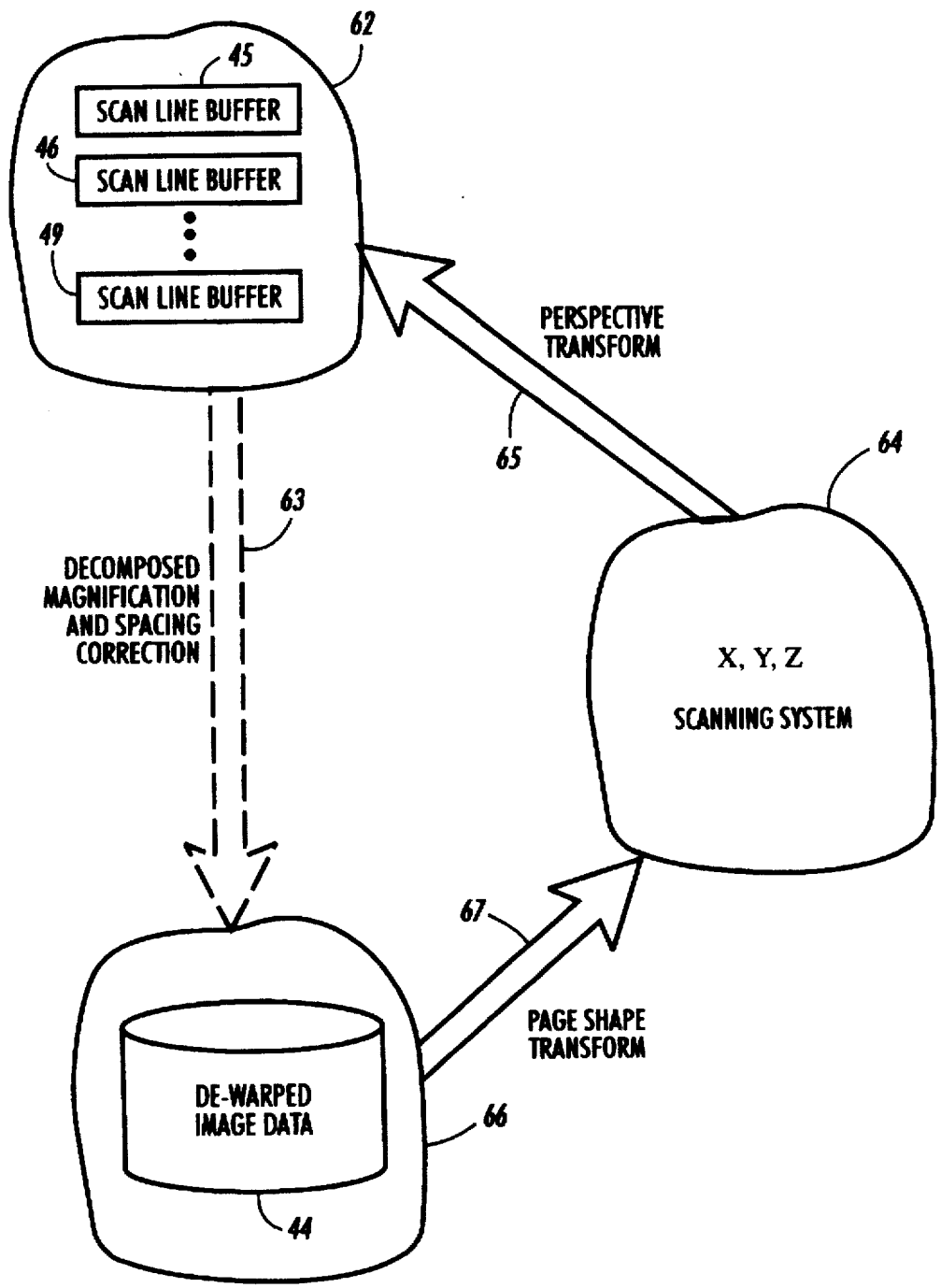
FIG. 7 illustrates a manner in which raw image data in a set of scan line buffers is corrected to form de-warped image data.

FIG. 7 illustrates a manner in which raw image data in the set of scan line buffers 30 is corrected to form de-warped image data 44. Raw image data in scan line buffers 45-49, capturing a scan line 60 of skewed image data, is represented in image space 62, and corrected image data or de-warped image data 44, indicative of de-skewed scan line 60, is represented in page space 66. More specifically, image space 62 represents the one-dimensional space of scan bar 16, and page space 66 represents the two-dimensional space of corrected output image data. In the event spine 11 of bound document 10 is not skewed relative to the reference line 5 in support plane 9 (e.g. the example shown in FIGS. 3 and 4), magnification and spacing corrections decompose into orthogonal components which can be readily corrected using clocking and focal controls within scanning assembly 14 along a path indicated generally by dotted line 63. In contrast, in order to correct or de-warp a scan line of image data with a skew angle θ that does not equal zero requires less direct paths 65 and 67 since corrections for distortion in this case do not decompose into orthogonal components. In between the image space 62 and page space 66 is world space 64 where the scanning system 4 is represented in three-dimensions (X,Y,Z).

In accordance with the present invention, raw image data is corrected to form de-warped image data by polling locations in image space 62 from page space 66 using the page shape transform along path 67 and the perspective transform along path 65. The scan controller 22 stores sufficient raw image data in the set of scan line buffers 30 for a corrected scan line of image data to be generated by output scan line generator 40. Consequently, scan line generator 40 is limited to polling locations in the set of scan line buffers necessary to correct a skewed scan line (e.g. scan line 60) that defines one output or corrected scan line. To generate another output scan line, requires that additional raw image data is recorded and stored in the set of scan line buffers 30. Locations in image space 62 are polled with two separate polling operations. The first polling operation determines a location in world space 64 that corresponds to a location in page space 66 using a page shape transform (determined by page shape calculator 32) along path 67. The second polling operation determines a location in image space 62 that corresponds to a location in world space 64 with the perspective transform along path 65. Values of pixels defining a location in image space 62 that corresponds to a location in page space 66 are interpolated to define an output pixel that forms part of an output scan line. It will be understood by those skilled in the art that interpolation is well known and can be performed using alternate schemes such as bi-linear interpolation, bi-cubic interpolation, and area mapping. A more detailed description of general imaging geometry is set forth in U.S. patent application Ser. No. 08/657,711 entitled "Platenless Book Scanning System With A General Imaging Geometry" to Saund et al., filed on May 30, 1996 and assigned to the same assignee as the present invention, the entire disclosure of which is incorporated herein by reference.

Figure 8:
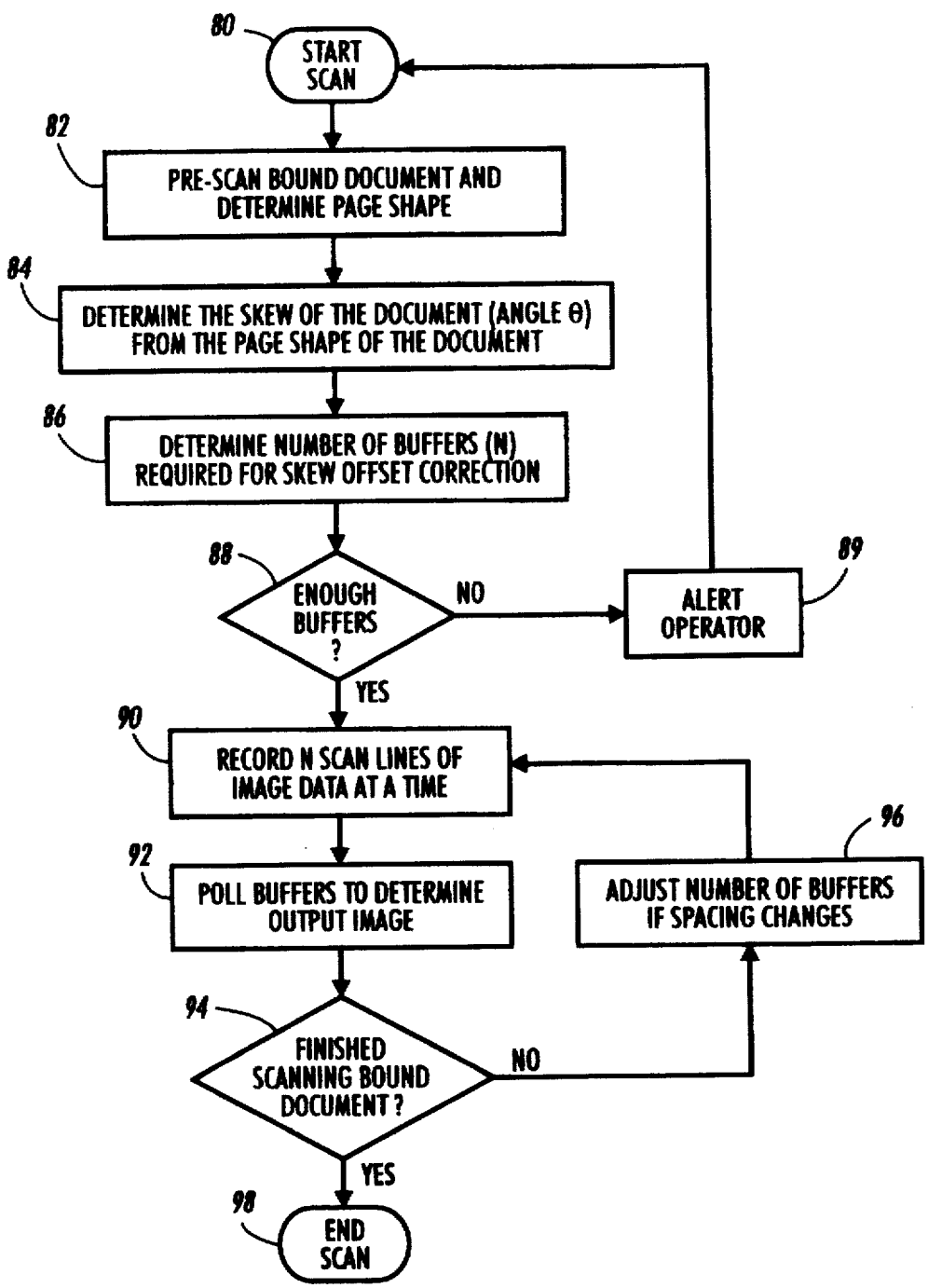
FIG. 8 is a flow diagram showing the general steps for carrying out the present invention.

FIG. 8 is a flow diagram showing the general steps for carrying out the present invention. At step 80, an operator invokes start scan switch 25 (shown in FIG. 1) after positioning bound document 10 in a face up and open condition in support plane 9 on platform 8. At step 82, bound document 10 is pre-scanned, and from the pre-scan a page shape of bound document 10 is determined. During pre-scan a low-resolution image with at least two-light stripes projected across it is recorded with scan bar 16 or two-dimensional sensor array 15. In addition at step 82, the geometrical page shape of bound document 10 is determined by identifying traces of the projected light stripes in the pre-scan image. With the traces of the light stripes, a three-dimensional contour map is formed thereby defining the non-planar contours of the surface of the bound document in world space 64. The non-planar contours of the surface define displacements of the bound document 10 away from the support plane 9. A method for identifying a trace of a light stripe in an image is set forth in U.S. patent application Ser. No. 08/657,711 which is cited above.

Using the trace of the light stripes determined at step 82, the skew of a reference axis of the bound document 10 relative to support plane 9 of scanning system 4 which is given by the angle θ (defined in FIGS. 5 and 6) is determined at step 84. More specifically, the light stripes identified at step 82 are evaluated to determine a spine region in each light stripe. If a spine region is detected for each light stripe, a line is formed through the detected spine regions to serve as the reference axis. The angle at which this line is offset from the reference line 5 in the support plane 9 (or the axis on which scan bar 16 is defined) defines the angle θ. A method for identifying a spine region is set forth in U.S. patent application Ser. No. 08/657,711, which is cited above. However, if a spine region cannot be detected at step 84, another reference axis can be used instead such as an edge of the bound document 10 that is parallel to the spine 11. An edge of the bound document 10 is identified in the pre-scan image with an edge detector. The edge detector evaluates page shape data 32 from each side of the imageable area towards its center in order to detect changes in background color. When changes are detected they are grouped into segments to form a line that defines an edge of the bound document 10. It will be appreciated by those skilled in the art that a number of other edge detection techniques exists as disclosed for example in "Computer Vision", Prentice-Hall, 1982 pp. 119–148. Similar to the offset between the spine region and the reference line 5 in the support plane 9, the offset between the detected edge of the bound document and the reference line 5 in the support plane 9 defines skew angle θ. However, if no edge is detected the spine of the bound document is assumed to be parallel to the reference line 5 in the support plane 9.

At step 86, the number of buffers (N) required to correct the skew of bound document 10 which is given by the angle θ is determined by skew detector 36. Initially, the length of the spine 11 or the length of a side of bound document 10 that is parallel to the spine 1 is determined using the edge detection techniques described above. With the length of the spine 11 (or a side of bound document 10) and the skew given by angle θ, a maximum number of buffers required to contain a skewed scan line of image data is calculated. Specifically, the number of buffers N is given by s* SIN(θ)/w, where "s" is the length of a spine or a side of bound document 10, and "w" is the imagable width of scan bar 16. The imagable width "w" of scan bar 16 varies depending on the sampling rate set by the clocking control 23 of mirror motor 20. In order to insure that sufficient buffers exist to correct the raw image data of bound document 10, N is computed for the worst case scenario. The worst case scenario occurs in the spine region 11 of bound document 10 where the sampling rate of image data is increased to compensate for changing focal lengths between scan lines.

At step 88, if the value of N buffers determined at step 86 exceeds the number of buffers in the set of scan line buffers 30, the operator of scanning system 4 is alerted at step 89 by indicator light 37 on top of controller 22 (shown in FIG. 1). When indicator light 37 is ON, the operator is required to adjust the bound document 10 so that there is less skew of the spine relative to a side of support plane 9. Once the skew of bound document 10 is adjusted, the operator restarts the scanning process by invoking start scan switch 25. Alternatively, if a sufficient number of buffers exist in the set of scan line buffers 30 to satisfy the number N determined at step 86, step 90 is executed. At step 90, the N scan line buffers are filled with raw image data recorded by scan bar 16. For example in FIG. 6, four scan line buffers 45–48 are filled with image data in order to determine the output scan line 60.

At step 92, in accordance with the invention locations in the set of N scan line buffers filled with raw image data at step 90 are polled to determine corrected image data that defines an output scan line. Corrected image data is then stored in a memory as de-warped image data 44. Locations in the set of N scan line buffers are identified for each pixel in an output scan line provided by generator 40. Depending on which location is polled in the set of scan line buffers 30, one or more pixels from different scan line buffers may be accessed to identify a corresponding output pixel. Specifically, a polling operation first determines a position of the corrected image pixel in world space 64 with the page shape transformation computed by page shape calculator 32. Subsequently, a location is identified in the N scan line buffers using the perspective transformation 42 from the position of the corrected image pixel in world space 64. The perspective transform 42 is a perspective transform of the scanning system 4 that is defined using standard calibration techniques. For example, the scanning assembly 14 can be calibrated using the technique disclosed by Strat in "Recovering the Camera Parameters from a Transformation Matrix," published in "Readings in Computer Vision: Issues, Problems, Principles, and Paradigms," Morgan Kaufmann Publishers Inc., 1987, the pertinent portions of which are incorporated herein by reference. Once determined, perspective transform 42 provides a mapping between any point in the world space 64 and any point in the image space 62 (shown in FIG. 7).

At step 94, the position of the mirror 19 is tested to determine whether the entire bound document 10 has been scanned. If the bound document has not been completely scanned, step 96 is executed which adjusts the number of N buffers used to poll values for pixels in the subsequent scan line. As noted above, depending on the shape of the bound document, scan controller 22 adjusts the clocking control 23 of mirror motor 20. This spacing adjustment increases or decreases the number of N buffers required to determine a de-warped scan line. Once the clocking adjustment is made at step 96, step 90 is executed again. If the document has finished scanning at step 94, step 98 is executed which places the scanning system 4 in a ready state for recording more pages from bound document 10.

In summary, the present invention provides a method and an apparatus for correcting non-planar documents that are spaced from and skewed relative to a support plane. Once a contour map of the bound document is determined, an angular offset is determined in order to identify the skew of a side of the bound document relative to a reference line in the support plane. The angular offset is used to identify a set of scan line buffers to record image data along an axis parallel to the reference line in the support plane. The number of scan line buffers filled in the set of scan line buffers depends on the skew of the bound document relative to the reference line in the support plane. This aspect of the present invention provides that only part of the image data defining the bound document is stored in memory before correcting image distortion.

It will be appreciated that the present invention is not limited to an overhead book scanner and can be readily implemented under a transparent platen. It will further be appreciated that a scanning system incorporating the present invention can be modified to incorporate functions of a system that automatically turns pages of a bound document. Examples of systems for turning pages of bound documents are disclosed by Turner et al. in U.S. patent application Ser. No. 08/570,880 entitled "Bound Document Imager with Page Turner," and U.S. patent application Ser. No. 08/570,791 entitled "Bound Document Imager with Air Jet Page Turning System," both filed on Dec. 12, 1995 and assigned to the same assignee as the present invention. It will also be appreciated that scanning system 4 can be readily modified to include job level programming as described by Rourke et al. in U.S. Pat. No. 5,119,206. Job level programming can include programming that manages input scanning as well as output rendering. Programming options for scanning bound documents include input commands for specifying whether to scan one or both sides of a bound document. Programming options for rendering scanned images of a bound document include specifying whether opposing sides of a bound document are to be printed on a common print media sheet or on separate print media sheets.

Various aspects of the disclosed bound document scanning system may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. A method for correcting image distortion while scanning a bound document, comprising the steps of:

providing a support for defining a support plane with a reference line therein;

positioning the bound document on the support, the bound document having non-planar page contours spaced a distance from the support plane, and the bound document having a spine skewed relative to the reference line in the support plane;

pre-scanning the bound document to provide a three-dimensional geometrical contour map that identifies the distance the non-planar page contours of the bound document are spaced from the support plane;

analyzing the geometrical contour map to measure document skew between the spine of the bound document and the reference line in the support plane;

providing a set of scan line buffers for storing multiple scan lines of image data that are recorded parallel to the reference line in the support plane;

selecting a minimum number of scan line buffers in the set of scan line buffers sufficient to capture an entire scan line of data aligned parallel to the spine of the bound document having the measured document skew determined by said analyzing step;

scanning the bound document to fill with image data the minimum number of scan line buffers identified by said selecting step, said scanning step scanning along a scan path parallel to the reference line in the support plane; and polling the image data stored in the minimum number of scan line buffers in accordance with the geometrical contour map to correct distortions caused by the measure of document skew of the spine of the bound document relative to the reference line in the support plane, and the non-planar page contours of the bound document, said polling step identifying locations in the set of scan line buffers to provide a corrected scan line of image data.

2. The method according to claim 1, further comprising the steps of:

scanning the bound document to replace one of the minimum number of scan line buffers with a scan line of image data, and repeating said polling step to provide a second scan line of image data having a corrected scan line of image data aligned along an axis parallel to an edge of the bound document.

3. The method according to claim 1, wherein said pre-scanning step includes the step of sub-sampling the bound document with a high resolution scan bar to record pre-scan data.

4. The method according to claim 1, wherein said scanning step scans the bound document with the high resolution scan bar.

5. The method according to claim 1, further comprising the steps of:

projecting a light stripe across the bound document;

recording pre-scan data; and identifying the projected light stripe in the recorded pre-scan data.

6. The method according to claim 5, wherein said recording step records the pre-scan data with a two-dimensional low resolution sensor array.

7. The method according to claim 5, further comprising the step of identifying a location of the spine of the bound document from the light stripe identified in the recorded pre-scan data.

8. The method according to claim 5, further comprising the step of identifying an edge of the bound document that is parallel to the identified location of the spine of the bound document.

9. The method according to claim 5, further comprising the step of assuming the spine of the bound document is parallel to the reference line in the support plane of the scan bar when the spine of the bound document is not identified in the recorded pre-scan data.

10. The method according to claim 1, wherein the minimum number of scan line buffers selected by said selecting step is less than the number of buffers in the set of scan line buffers.

11. The method according to claim 1, wherein the minimum number of scan line buffers selected by said selecting step is equal to the number of buffers in the set of scan line buffers.

12. The method according to claim 1, further comprising the step of providing an indication to reduce the angular offset of the bound document relative to the support plane in response to selecting a minimum number of scan line buffers greater than the number of buffers in the set of scan line buffers.

13. A method for scanning a bound document on a support defining a support plane, the bound document having non-planar page contours spaced a distance from the support plane, and the bound document having a spine skewed relative to the reference line in the support plane, comprising the steps of:

recording pre-scan data during a first scan of the bound document, the pre-scan data providing a three dimensional geometrical contour map of a page of the bound document relative to the support plane;

calculating from the geometrical contour map an angular offset, the angular offset providing a measure of document skew between the spine of the bound document relative to the reference line in the support plane;

identifying a set of scan line buffers for storing a scan line of image data, the number of scan line buffers in the set of scan line buffers being a function of the calculated angular offset;

recording image data during a second scan of the bound document, the image data filling each scan line buffer in the set of scan line buffers; and polling pixels in the set of scan line buffers in accordance with the geometrical contour map to correct distortions caused by the measure of document skew of the spine of the bound document relative to the reference line in the support plane, and the non-planar page contours of the bound document, said polling step identifying pixel locations in the set of scan line buffers to provide a corrected scan line of image data.

14. The method according to claim 13, wherein said polling step provides the corrected scan line of image data by polling pixels in the set of scan line buffers with a page shape transform and a perspective transform.

15. An apparatus for scanning a bound document, comprising:

a support for supporting the bound document in an open condition in a support plane with a reference line defined therein;

means for recording geometrical image data of the bound document, the geometrical image data providing a non-planar map of the bound document in three-dimensions relative to the support plane;

means for analyzing the geometrical image data to identify an angular offset between a reference axis of the bound document and the reference line in the support plane, the angular offset providing a measure of document skew between the reference axis of the bound document and the reference line in the support plane;

means for identifying a set of scan line buffers for storing multiple scan lines of image data, the set of scan line buffers being a function of the angular offset determined by said analyzing means;

means for scanning the bound document to record a set of scan lines of image data sufficient to fill the set of scan line buffers, each scan line in the set of scan lines of image data being aligned along an axis parallel to the reference line in the support plane; and an output scan line generator for correcting image data stored in said set of scan line buffers, said output scan line generator polling the image data stored in the set of scan line buffers in accordance with the geometrical contour map to correct distortion caused by the measure of document skew of the spine of the bound document relative to the reference line in the support plane, and the non-planar page contours of the bound document, said output scan line generator identifying locations in the set of scan line buffers to provide a corrected scan line of image data aligned parallel to the reference axis of the bound document.

16. The apparatus according to claim 15, further comprising a scan controller for controlling access to the set of scan line buffers by said output scan line generator.

17. The apparatus according to claim 15, wherein said identifying means identifies the set of scan line buffers from a predetermined set of scan line buffers.

18. The apparatus according to claim 17, wherein the set of scan line buffers is less than the predetermined set of scan line buffers.

19. The apparatus according to claim 17, further comprising means for indicating that the set of scan line buffers identified by said identifying means is greater than the predetermined set of scan line buffers.

20. The apparatus according to claim 15, wherein said recording means is a two-dimensional low resolution sensor.

21. The apparatus according to claim 15, wherein said scanning means is a one-dimensional scan bar.

22. The apparatus according to claim 15, wherein said recording means sub-samples the bound document with said scanning means.

23. The apparatus according to claim 15, wherein the reference axis of the bound document is parallel to the spine of the bound document.

24. The method according to claim 1, wherein said polling step provides the corrected scan line of image data by polling locations in the image data stored in the minimum number of scan line buffers with a page shape transform and a perspective transform.

25. The apparatus according to claim 15, wherein said output scan line generator provides the corrected scan line of image data by polling locations in the image data stored in the set of scan line buffers with a page shape transform and a perspective transform.

* * * * *